(12) United States Patent
Koike et al.

(10) Patent No.: US 7,134,335 B2
(45) Date of Patent: Nov. 14, 2006

(54) VIBRATORY GYRO PIEZOELECTRIC VIBRATOR

(75) Inventors: Masato Koike, Toyama-ken (JP); Katsumi Fujimoto, Toyama-ken (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 94 days.

(21) Appl. No.: 10/923,232

(22) Filed: Aug. 20, 2004

(65) Prior Publication Data

US 2005/0072230 A1    Apr. 7, 2005

(30) Foreign Application Priority Data

Oct. 6, 2003    (JP) .............................. 2003-347118

(51) Int. Cl.
*G01P 9/04* (2006.01)
(52) U.S. Cl. ................................. 73/504.12; 73/504.16
(58) Field of Classification Search ............. 73/504.12, 73/504.14, 504.15, 504.16; 310/332
See application file for complete search history.

(56) References Cited

U.S. PATENT DOCUMENTS 5,693,998 A * 12/1997 Fujimoto et al. ........... 310/366

2003/0042820 A1 * 3/2003 Unami et al. ............... 310/328

FOREIGN PATENT DOCUMENTS

| JP | 08-320233 | 12/1996 |
|---|---|---|
| JP | 09-269227 | 10/1997 |
| JP | 2003-069372 | 3/2003 |

* cited by examiner

*Primary Examiner*—John E. Chapman
(74) *Attorney, Agent, or Firm*—Keating & Bennett,LL

(57) ABSTRACT

A vibratory gyro piezoelectric vibrator includes a vibrating body having a laminate of piezoelectric layers stacked on each other in a lamination direction, and having a length extending in the lamination direction. The vibratory gyro piezoelectric vibrator uses longitudinal piezoelectric effects of the piezoelectric layers and operates such that a first bending vibration is excited in which the vibrating body bends in a width direction of the vibrating body substantially perpendicular to the lamination direction of the piezoelectric layers, and a Coriolis force is caused in response to the first bending vibration such that a second bending vibration is excited in which the vibrating body bends in a thickness direction of the vibrating body substantially perpendicular to both of the lamination direction and the vibration direction of the first bending vibration.

11 Claims, 9 Drawing Sheets

VIBRATORY GYRO PIEZOELECTRIC VIBRATOR

BACKGROUND OF THE INVENTION

1. Field of the Invention

The present invention relates to a vibratory gyro piezoelectric vibrator and, in particular, to a structure of a piezoelectric vibrator including a vibrating body, which has a length extending in a lamination direction of a plurality of laminated piezoelectric layers and takes advantage of a longitudinal piezoelectric effect of the piezoelectric layers.

2. Description of the Related Art

Conventionally, a piezoelectric tuning bar and a piezoelectric tuning fork are known as a piezoelectric vibrator for a vibratory gyro. For example, Japanese Unexamined Patent Application Publication No. 8-320233 discloses a piezoelectric tuning bar having piezoelectric elements disposed on three sides of a right-triangular-pillar-shaped vibrating body made of metal. The piezoelectric tuning bar bends and vibrates the vibrator in a direction that is perpendicular to the surface having the piezoelectric elements in response to the application of an alternating voltage to the piezoelectric elements.

Furthermore, for example, Japanese Unexamined Patent Application Publication No. 9-269227 discloses a piezoelectric tuning bar having a pillar-shaped vibrating body, which has a length extending in a direction that extends in the direction that is perpendicular to the thickness direction of two pasted piezoelectric substrates. The piezoelectric substrates are polarized in the opposite direction of the thickness direction. Here, main surfaces of the vibrating body are opposed in the thickness direction of the vibrating body and have external electrodes provided thereon. In response to application of alternating voltage to these external electrodes, the vibrating body is bent and vibrated in the thickness direction of the piezoelectric substrate. Since a piezoelectric tuning fork has a similar construction as that of a piezoelectric tuning bar and the construction is publicly known, the descriptions will be omitted herein.

Both of these piezoelectric vibrators take advantage of a characteristic that, in response to application of alternating voltage to electrodes on both sides of the piezoelectric body in the polarization direction, a piezoelectric body stretches in the direction perpendicular to a direction of the voltage application. In other words, a plate-shaped piezoelectric body stretches in the plane direction in response to application of voltage to electrodes on both of the front and back surfaces of the piezoelectric body, which is polarized in the thickness direction. This characteristic is called a lateral piezoelectric effect (d31 effect).

In reality, a piezoelectric body stretches also in the thickness direction in response to application of voltage, and the characteristic is called a longitudinal piezoelectric effect (d33 effect). However, conventionally, a general piezoelectric vibrator does not actively use a longitudinal piezoelectric effect. This is because the stretch due to a longitudinal piezoelectric effect is smaller than the stretch due to a lateral piezoelectric effect.

In recent years, more and more electronic components are lead-free, and materials containing a lead component tend to be not used as a result. Furthermore, since many conventional piezoelectric materials contain a lead component, new piezoelectric vibrators which contain piezoelectric materials without a lead component are being demanded. However, a piezoelectric material without a lead component produces a small amount of stretch from a lateral piezoelectric effect, which is a problem. Therefore, using a piezoelectric material without a lead component is difficult for a piezoelectric vibrator having a conventional structure.

In order to produce a piezoelectric vibrator containing a piezoelectric material without a lead component, a longitudinal piezoelectric effect may be actively used instead of a lateral piezoelectric effect. In other words, a vibrating body may include a laminate of multiple piezoelectric layers stacked in a lamination direction and has a length extending in the direction of the laminate. A sum of longitudinal piezoelectric effects of the piezoelectric layers of the vibrating body may result in a certain amount of stretch of the entire integrated vibrating body.

As an example of a piezoelectric vibrator having the laminate structure, Japanese Unexamined Patent Application Publication No. 2003-69372 discloses a structure that is not for a vibratory gyro. The piezoelectric vibrator includes an integral vibrating body having a laminate of multiple piezoelectric layers polarized in the thickness direction, which is coincident with the lamination direction. In the laminate, the piezoelectric layers alternately have opposite polarization directions from each other. A piezoelectric layer between a first internal electrode and a third internal electrode and a piezoelectric layer between a second internal electrode and the third internal electrode are alternately opposed to each other. These internal electrodes are provided in substantially an entire area in the thickness direction or width direction of the vibrating body, which is perpendicular to the lamination direction in both cases.

Furthermore, the longitudinal direction is coincident with the lamination direction on a main surface on one side of the vibrator in the thickness direction. First and second external electrodes are arranged in parallel through a channel portion in the width direction perpendicular to both of the lamination direction and the thickness direction. The first and second internal electrodes are spaced from each other in parallel and are connected to and are conducted to the first and second external electrodes, respectively. The third internal electrode is not connected to any of the external electrodes and is electrically floating.

When an alternating voltage from the first and second external electrode is input to a piezoelectric vibrator disclosed in Japanese Unexamined Patent Application Publication No. 2003-69372, that is, a piezoelectric vibrator having the laminate structure, piezoelectric layers of the vibrator have opposite polarization directions from each other and stretch because of the longitudinal piezoelectric effect. Here, a piezoelectric layer between a first internal electrode and a third internal electrode and a piezoelectric layer between a second internal electrode and the third internal electrode stretch in the opposite directions from each other. As a result, the vibrating body bends and vibrates in the width direction of the vibrating body, which is perpendicular to the lamination direction of the piezoelectric layer as a whole.

The conventional piezoelectric vibrator requires a resonator mainly using an electric characteristic. Furthermore, the piezoelectric vibrator has a laminate structure because using bending vibration based on stretching due to a longitudinal piezoelectric effect is more advantageous in reduction of the size of the entire structure than using direct stretching due to a lateral piezoelectric effect. However, while a first bending vibration is being excited in which a vibrating body bends in the direction that is perpendicular to the lamination direction of piezoelectric layers in the piezoelectric vibrator and when an angular velocity about the lamination direction as the axis of rotation is applied to the piezoelectric vibrator, second bending vibration may be excited by the action of a Coriolis force. Here, in the second bending vibration, the vibrating body bends in the direction that is perpendicular to both of the lamination direction and the vibration direction of the first bending vibration.

However, since the piezoelectric vibrator does not have a detecting unit for detecting an output from the second bending vibration, the piezoelectric vibrator cannot detect an output caused by the second bending vibration. Thus, the piezoelectric vibrator cannot be used as a vibratory gyro.

SUMMARY OF THE INVENTION

In order to overcome the problems described above, preferred embodiments of the present invention provide a vibratory gyro piezoelectric vibrator which has a laminate structure but can detect an output caused by a second bending vibration excited in response to application of an angular speed and, as a result, can be used as a vibratory gyro without any inconvenience.

According to a preferred embodiment of the present invention, a vibratory gyro piezoelectric vibrator includes a vibrating body having a laminate of piezoelectric layers stacked on each other in a lamination direction and having a length extending in the lamination direction, the vibratory gyro piezoelectric vibrator using longitudinal piezoelectric effects of the piezoelectric layers, wherein a first bending vibration in which the vibrating body bends in a width direction of the vibrating body perpendicular to the lamination direction of the piezoelectric layers and a second bending vibration in which the vibrating body bends in a thickness direction of the vibrating body perpendicular to both of the lamination direction and the vibration direction of the first bending vibration are excited.

According to another preferred embodiment of the present invention, while one of the first bending vibration and the second bending vibration is being excited, an output caused by the other bending vibration is detected.

Preferably, the vibrating body includes first and second internal electrodes and third internal electrodes alternately disposed between the piezoelectric layers polarized alternately oppositely in the lamination direction. The first and second internal electrodes may be separately disposed substantially parallel to the width direction of the vibrating body. An area where the first and second internal electrodes are opposed to the third internal electrodes may be either an upper portion or a lower portion in the thickness direction of the vibrating body.

The vibrating body may include first and second external electrodes spaced in the width direction of the vibrating body in parallel on one main surface. The first and second internal electrodes may extend to the one main surface of the vibrating body and be conducted to the first and second external electrodes, respectively. The third internal electrode may extend to the other main surface of the vibrating body and be conducted to the third external electrode provided on the other main surface of the vibrating body.

In the vibratory gyro piezoelectric vibrator, the first bending vibration and the second bending vibration are both excited. When bending vibration is excited, an output caused by the bending vibration is also detected in general. Therefore, in the vibratory gyro piezoelectric vibrator, a Coriolis force acts in response to application of an angular speed about the lamination direction of the piezoelectric layers as an axis of rotation. Furthermore, when bending vibration is caused by a Coriolis force, an output caused by the bending vibration is detected. As a result, the angular speed applied to the piezoelectric vibrator is detected, and the piezoelectric vibrator can be used as a vibratory gyro.

While one bending vibration is being excited, an output caused by the other bending vibration is detected. Therefore, when bending vibration is excited by a Coriolis force caused in response to application of an angular speed, an output caused by the bending vibration is reliably detected.

In the vibratory gyro piezoelectric vibrator, the area where the first and second internal electrodes are opposed to the third internal electrode through piezoelectric layers polarized alternately oppositely in the lamination direction may be either an upper portion or a lower portion in the thickness direction of the vibrating body. Therefore, when electric signals for excitation are applied between the first and second internal electrodes, bending vibration is excited in which the vibrating body is bent in the width direction that is perpendicular to the lamination direction of the piezoelectric layers. When electric signals for excitation are applied between both of the first and second internal electrodes and the third internal electrode, bending vibration is excited in which the vibrating body is bent in the thickness direction that is perpendicular to the lamination direction of the piezoelectric layers.

Under this condition, a Coriolis force acts in response to an angular speed about the lamination direction of the piezoelectric layers as an axis of rotation. As a result, the vibrating body bending and vibrating in the width direction newly bends and vibrates in the thickness direction, and the vibrating body bending and vibrating in the thickness direction newly bends and vibrates in the width direction. Therefore, detection of an output caused by the bending vibration in the thickness direction or bending vibration in the width direction that is newly excited allows for the detection of an angular speed applied to the piezoelectric vibrator.

In the vibratory gyro piezoelectric vibrator, the first and second external electrodes are conducted to the first and second internal electrodes, respectively, and the third external electrode is conducted to the third internal electrodes. Thus, when electric signals for excitation are applied between the first and second external electrodes, bending vibration is caused in which the vibrating body is bent in the width direction that is perpendicular to the lamination direction of the piezoelectric layers. When electric signals for excitation are applied between both of the first and second external electrodes and the third external electrode, bending vibration is caused in which the vibrating body is bent in the thickness direction that is perpendicular to the lamination direction of the piezoelectric layers. As a result, detection of an output caused by the bending vibration in the thickness direction or bending vibration in the width direction which is newly excited allows the detection of an angular speed applied to the piezoelectric vibrator.

Other features, elements, characteristics and advantages of the present invention will become more apparent from the following detailed description of preferred embodiments thereof with reference to the attached drawings.

DETAILED DESCRIPTION OF PREFERRED EMBODIMENTS

FIRST PREFERRED EMBODIMENT

Figure 1:
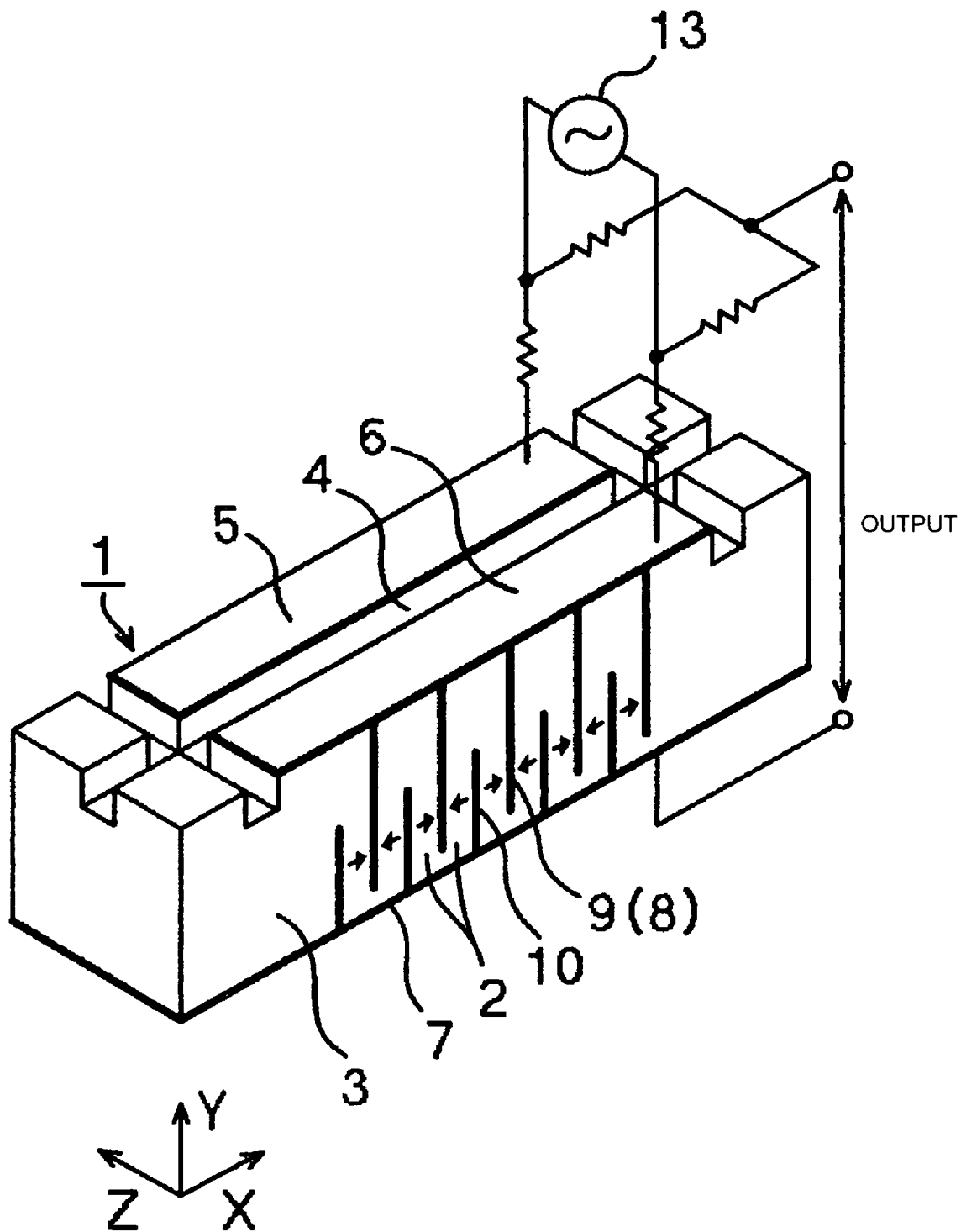
FIG. 1 is a perspective view showing an external form of a vibratory gyro piezoelectric vibrator according to a first preferred embodiment of the present invention.
Figure 2:
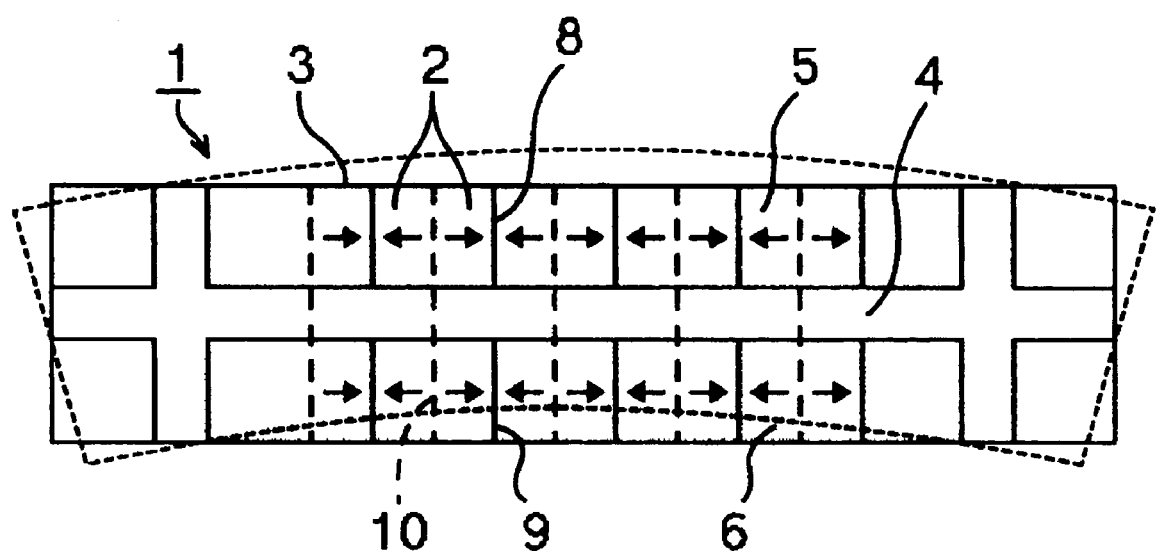
FIG. 2 is a top view showing a plane form thereof.
Figure 3:
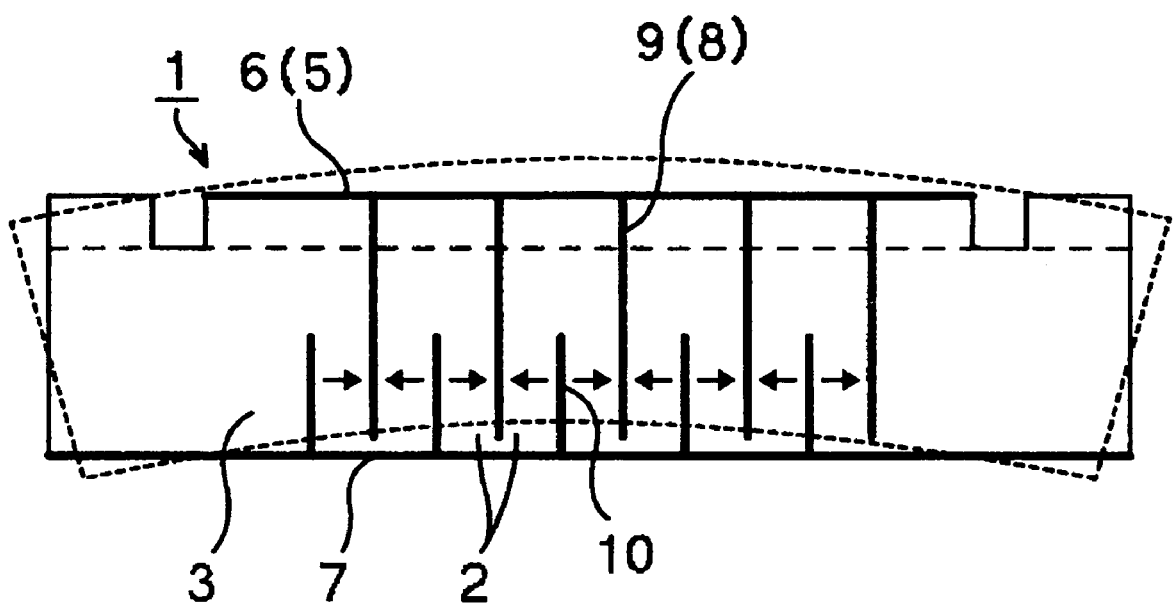
FIG. 3 is a side view showing a side form thereof.

FIGS. 1 to 3 include a vibratory gyro piezoelectric vibrator 1 and piezoelectric layers 2. The shown arrows indicate polarization directions of the piezoelectric layers 2.

The vibratory gyro piezoelectric vibrator 1 is a laterally-driven and longitudinally-detected piezoelectric tuning bar and includes a vibrating body 3 having a laminate of multiple piezoelectric layers 2 stacked in a lamination direction. The entire vibrating body 3 bends and vibrates due to longitudinal piezoelectric effects of the piezoelectric layers 2. In the vibrating body 3, a longitudinal direction X is coincident with the lamination direction of the piezoelectric layers 2, a thickness direction Y is a first direction perpendicular to the lamination direction (longitudinal direction X) of the piezoelectric layer 2, and a width direction Z is a second direction perpendicular to both of the lamination direction (longitudinal direction X) of the piezoelectric layers 2 and the first direction (thickness direction Y) perpendicular to the lamination direction (longitudinal direction X) of the piezoelectric layers 2.

In other words, the vibratory gyro piezoelectric vibrator 1 includes the substantially parallelepiped vibrating body 3 having a laminate of the piezoelectric layers 2 polarized in opposite directions relative to each other in the thickness direction. In this case, the thickness direction is coincident with the longitudinal direction X. The center line is defined on one main surface (upper main surface in FIG. 1) parallel to the longitudinal direction X of the vibrating body 3. A channel 4 extends along the center line on the main surface. First and second external electrodes 5 and 6 are parallel on the one main surface and are separated by the channel 4. A third external electrode 7 is arranged to extend over the entire other main surface (lower main surface in FIG. 1) which is perpendicular to the thickness direction Y of the vibrating body 3.

Figure 4:
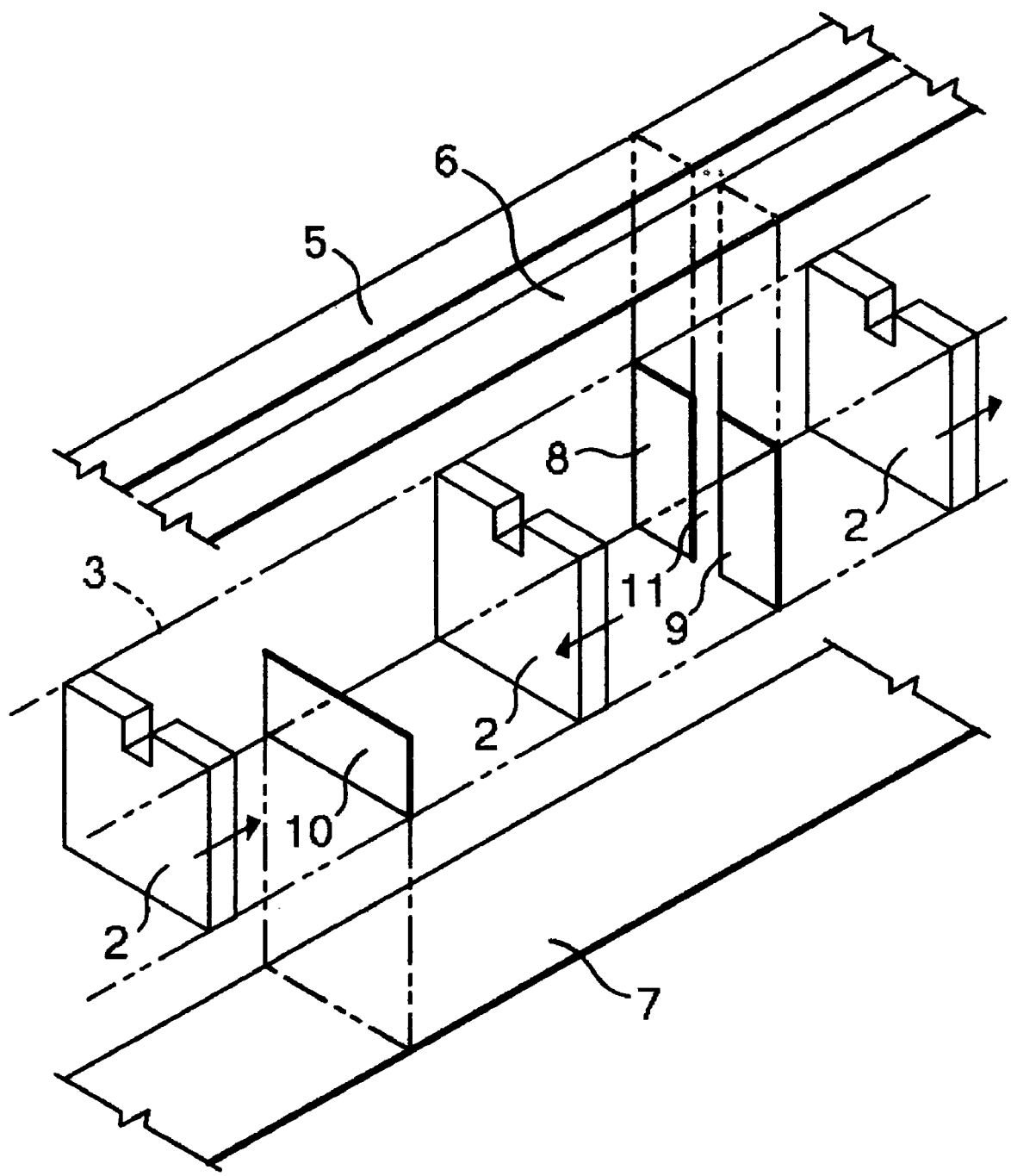
FIG. 4 is an exploded perspective view showing an enlarged essential portion of the vibratory gyro piezoelectric vibrator according to the first preferred embodiment of the present invention.

In the vibrating body 3, first and second internal electrodes 8 and 9 and third internal electrodes 10 are alternately provided between piezoelectric layers 2. Here, the first internal electrode 8 and the second internal electrode 9 having a gap 11 (shown in FIG. 4) therebetween are arranged parallel to the width direction Z of the vibrating body 3. The first internal electrode 8 and the second internal electrode 9 are provided in a predetermined area of one surface of the piezoelectric layer 2, that is, an area extending to the one main surface (the upper main surface) of the vibrating body 3 and extending to the vicinity of the other main surface (the lower main surface). The first and second internal electrodes 8 and 9 extending to the one main surface of the vibrating body 3 are connected and are conducted to the first and second external electrodes 5 and 6, respectively.

On the other hand, the third internal electrode 10 is provided in a predetermined area of the other surface of the piezoelectric layer 2, that is, an area extending to the other main surface of the vibrating body 3 and spaced away from the one main surface. In other words, the third internal electrode 10 is provided in a lower half area in the thickness direction Y of the vibrating body 3. The third internal electrode 10 extending to the other main surface of the vibrating body 3 is connected and is conducted to the third external electrode 7. In other words, the third internal electrodes 10 do not extend to the one main surface of the vibrating body 3 and are opposed to both of the first and second internal electrodes 8 and 9 through the lower portion only of the piezoelectric layers 2 alternately having the opposite polarization directions from each other.

From another point of view, only the lower side of the vibrating body 3 in the thickness direction Y has the area in which the first and second internal electrodes 8 and 9 are opposed to the third internal electrodes 10. In FIGS. 1 to 4, the first and second internal electrodes 8 and 9 and the third internal electrodes 10 are exposed on a side surface of the vibrating body 3 in the width direction Z. However, the internal electrodes 8 to 10 apparently do not have to be exposed on a side surface of the vibrating body 3.

Next, an operation of the vibratory gyro piezoelectric vibrator 1 will be described with reference to FIGS. 1 to 3.

First of all, as shown in FIG. 1, an oscillator circuit 13 is connected between the first external electrodes 5 and the second external electrodes 6. In response to application of alternating voltage to the oscillator circuit 13, electric signals having opposite phases are applied to the first and second external electrodes 5 and 6. Electric fields having opposite phases to each other are applied to the piezoelectric layers 2 between the first and second internal electrodes 8 and 9 and the third internal electrodes 10. In this case, the piezoelectric layers 2 have opposite polarization directions to each other. Thus, the piezoelectric layers 2 between the first internal electrodes 8 and the third internal electrodes 10 and the piezoelectric layers 2 between the second internal electrodes 9 and the third internal electrodes 10 stretch with opposite phases to each other. As a result, the vibrating body 3 bends and vibrates in the width direction Z.

In other words, as shown in the dashed line in FIG. 2, a first bending vibration is excited in which the vibrating body 3 is bent in the width direction Z perpendicular to the longitudinal direction X. Then, the vibrating body 3 repeats vibration between an attitude bending as indicated by the dashed line in FIG. 2 and an attitude bending in the opposite direction thereof.

Furthermore, in response to application of an angular speed about the longitudinal direction X of the vibrating body 3 as the axis of rotation while the first bending vibration is being excited, a Coriolis force is caused in the direction perpendicular to the vibration direction (width direction Z of the vibrating body 3) of the first bending vibration. Then, the Coriolis force acts on the vibrating body 3. Thus, second bending vibration as indicated by the dashed line in FIG. 3 is caused. That is, the second bending vibration is caused in which the vibrating body 3 is bent in the thickness direction Y of the vibrating body 3. In this case, the thickness direction Y is perpendicular to both of the longitudinal direction X and width direction Z of the vibrating body 3.

Here, the vibrating body 3 repeats vibration between an attitude bending as indicated by the dashed line in FIG. 3 and an attitude bending in the opposite direction thereof. In this case, only the lower side of the vibrating body 3 in the thickness direction Y has the area in which the first and second internal electrodes 8 and 9 are opposed to the third internal electrodes 10. Therefore, when the second bending vibration is caused and the vibrating body 3 bends and vibrates in the thickness direction Y, an output depending on the second bending vibration is produced between both of the first and second internal electrodes 8 and 9 and the third internal electrodes 10. Therefore, as shown in FIG. 1, outputs caused in both of the first and second external electrodes 5 and 6 and the third external electrode 7 are detected, and a direction and magnitude of an applied angular speed are detected based on the output.

By the way, in the vibratory gyro piezoelectric vibrator 1 having the above-described laminate structure, the piezoelectric layers 2 may contain a piezoelectric material with or without a lead component. Therefore, the demand for electronic components free from lead can be met more easily, which is an advantage.

SECOND PREFERRED EMBODIMENT

FIGS. 5 to 8 include a vibratory gyro piezoelectric vibrator 21. The arrows shown in FIGS. 5–8 indicate polarization directions of piezoelectric layers. The same reference numerals are given to the same components of the vibratory gyro piezoelectric vibrator 21 as those of the vibratory gyro piezoelectric vibrator 1 according to the first preferred embodiment of the present invention.

The vibratory gyro piezoelectric vibrator 21 is a longitudinally-driven and laterally-detected piezoelectric tuning bar and includes a vibrating body 22 having a laminate of multiple piezoelectric layers 2. The entire vibrating body 22 bends and vibrates due to longitudinal piezoelectric effects of the piezoelectric layers 2. In the vibrating body 22, a longitudinal direction X is coincident with the lamination direction of the piezoelectric layers 2, a thickness direction Y is a first direction perpendicular to the lamination direction (longitudinal direction X) of the piezoelectric layer 2, and a width direction Z is a second direction perpendicular to both of the lamination direction (longitudinal direction X) of the piezoelectric layers 2 and the first direction (thickness direction Y) perpendicular to the lamination direction (longitudinal direction X) of the piezoelectric layers 2.

The vibratory gyro piezoelectric vibrator 21 includes the substantially parallel-piped vibrating body 22 having a laminate of the piezoelectric layers 2 polarized in opposite directions relative to each other in the thickness direction. In this case, the thickness direction is coincident with the longitudinal direction X. The center line is defined on one main surface (upper main surface in FIG. 5) parallel to the longitudinal direction X of the vibrating body 22. A channel 4 extends along the center line on the main surface. First and second external electrodes 5 and 6 are parallel on the one main surface and are separated by the channel 4. Third external electrode 7 is arranged over the entire other main surface (lower main surface in FIG. 5) which is perpendicular to the thickness direction Y of the vibrating body 22. In the vibrating body 22, first and second internal electrodes 23 and 24 and third electrodes 25 are alternately provided between piezoelectric layers 2.

Here, the first internal electrode 23 and the second internal electrode 24 having a gap 11 therebetween are provided parallel to the width direction Z of the vibrating body 22. The first internal electrode 23 and the second internal electrode 24 are provided in a predetermined area of one surface of the piezoelectric layer 2, that is, an area extending to the one main surface of the vibrating body 22 and being spaced away from the other main surface of the vibrating body 22. In other words, the first internal electrode 23 and the second internal electrode 24 are arranged over the upper half of the vibrating body 22 in the thickness direction Y. The first and second internal electrodes 23 and 24 extending to the one main surface of the vibrating body 22 are connected and are conducted to the first and second external electrodes 5 and 6, respectively.

On the other hand, the third internal electrode 25 is provided in a predetermined area of the other surface of the piezoelectric layer 2, that is, an area extending from the vicinity of the one main surface of the vibrating body 22 to the other main surface. The third internal electrode 25 extending to the other main surface of the vibrating body 22 is connected and is conducted to the third external electrode 7. In other words, the third internal electrodes 25 do not extend to the one main surface of the vibrating body 22 and are opposed to both of the first and second internal electrodes 23 and 24 through the upper portion only of the piezoelectric layers 2 alternately having the opposite polarization directions from each other. From another point of view, only the upper side of the vibrating body 22 in the thickness direction Y has the area in which the first and second internal electrodes 23 and 24 are opposed to the third internal electrodes 25.

Next, an operation of the vibratory gyro piezoelectric vibrator 21 will be described with reference to FIGS. 5 to 7.

Figure 5:
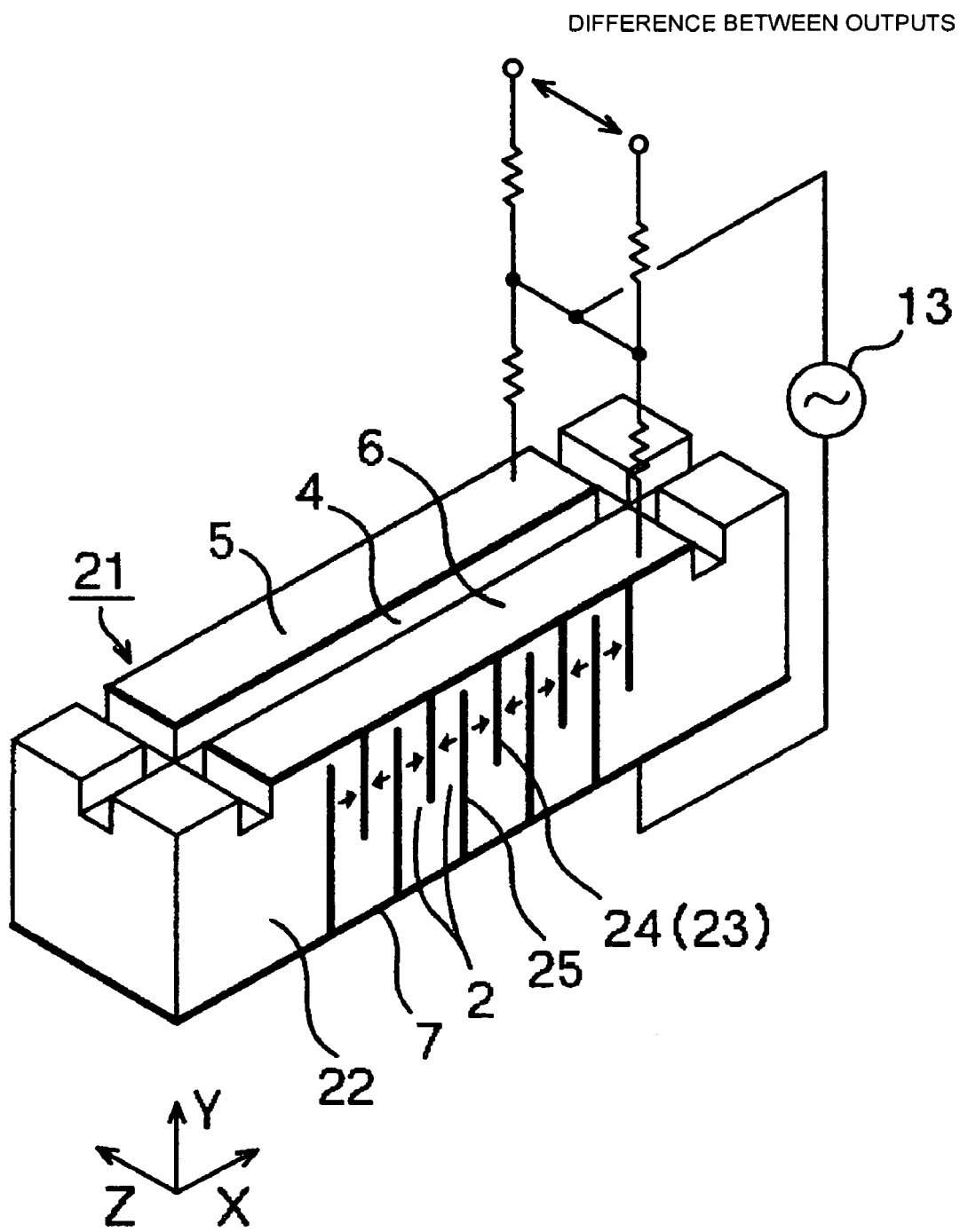
FIG. 5 is a perspective view showing an external form of a vibratory gyro piezoelectric vibrator according to a second preferred embodiment of the present invention.
Figure 6:
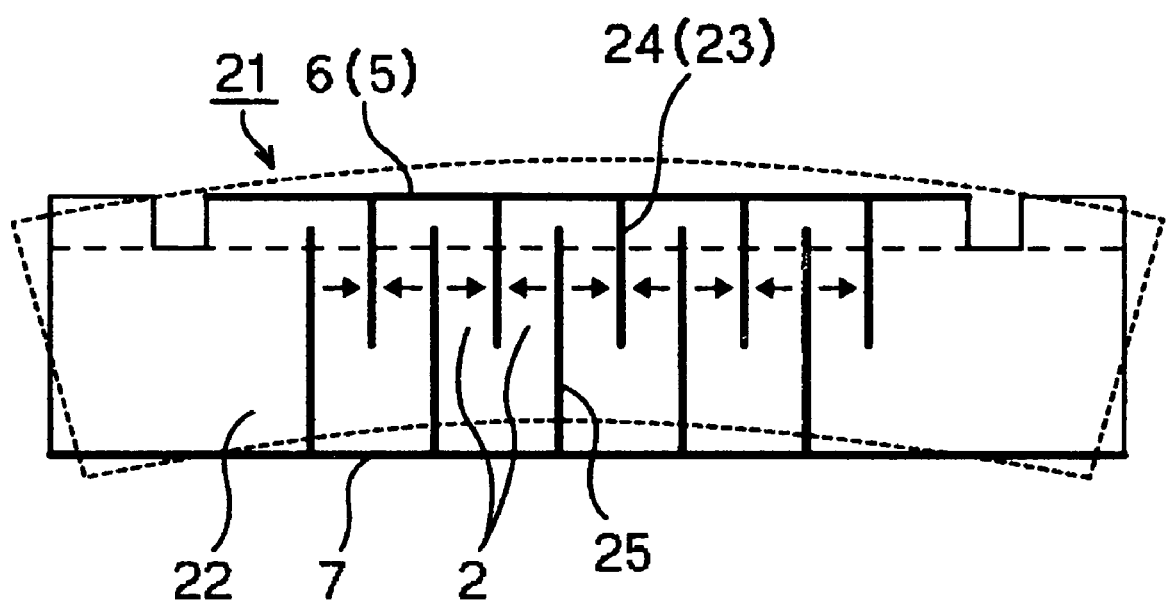
FIG. 6 is a side view showing a side form thereof.

First of all, as shown in FIG. 5, an oscillator circuit 13 is connected between both of the first external electrode 5 and the second external electrode 6 and the third external electrode 7. In response to application of alternating voltage to the oscillator circuit 13, electric signals having the same phase are applied to both of the first and second internal electrodes 23 and 24. Electric fields having the same phase are applied to the piezoelectric layers 2 between the first internal electrodes 23 and the third internal electrodes 25 and the piezoelectric layers 2 between the second internal electrodes 24 and the third internal electrodes 25.

Thus, the upper portion of the vibrating body 22 having the piezoelectric layers 2 between the first and second internal electrodes 23 and 24 and the third internal electrodes 25 expands and contracts while the lower portion of the vibrating body 22 does not expand or contract. Therefore, the vibrating body 22 as a whole bends and vibrates in the thickness direction Y. In other words, as shown in the dashed line in FIG. 6, a first bending vibration is excited in which the entire vibrating body 22 is bent in the thickness direction Y perpendicular to the longitudinal direction X and the width direction Z. Then, the vibrating body 22 repeats vibration between an attitude bending as indicated by the dashed line in FIG. 6 and an attitude bending in the opposite direction thereof.

Furthermore, in response to application of an angular speed about the longitudinal direction X of the vibrating body 22 as the axis of rotation while the first bending vibration is being excited, a Coriolis force is caused in the direction perpendicular to the vibration direction (thickness direction Y of the vibrating body 22) of the first bending vibration. Then, the Coriolis force acts on the vibrator 23. Thus, second bending vibration as indicated by the dashed line in FIG. 7 is caused. That is, the second bending vibration is caused in which the vibrating body 22 is bent in the width direction Z of the vibrating body 22. In this case, the width direction Z is perpendicular to both of the longitudinal direction X and thickness direction Y of the vibrating body 22.

Figure 7:
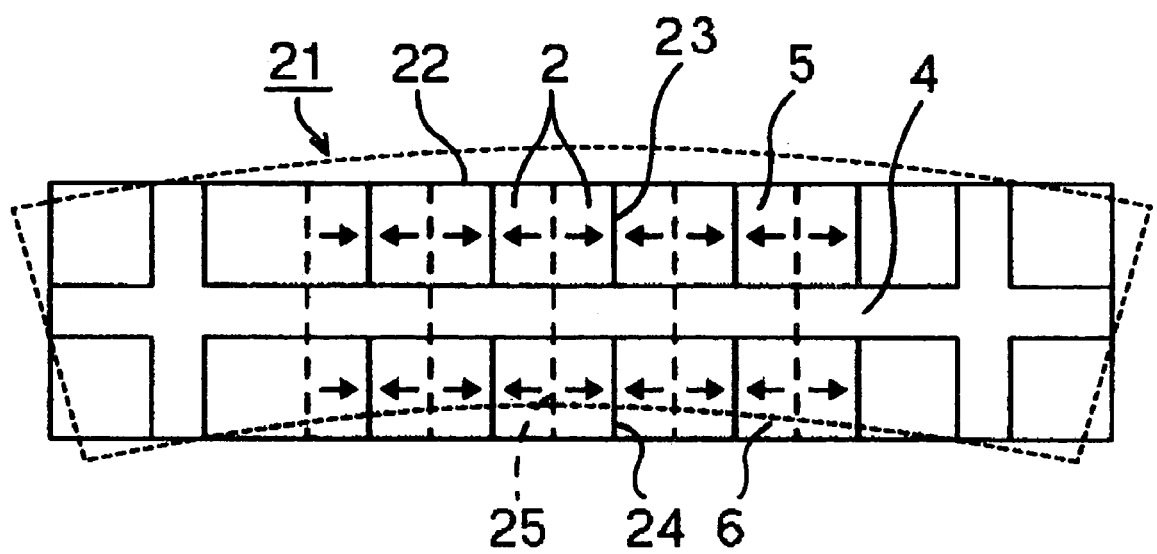
FIG. 7 is a top view showing a plane form thereof.
Figure 8:
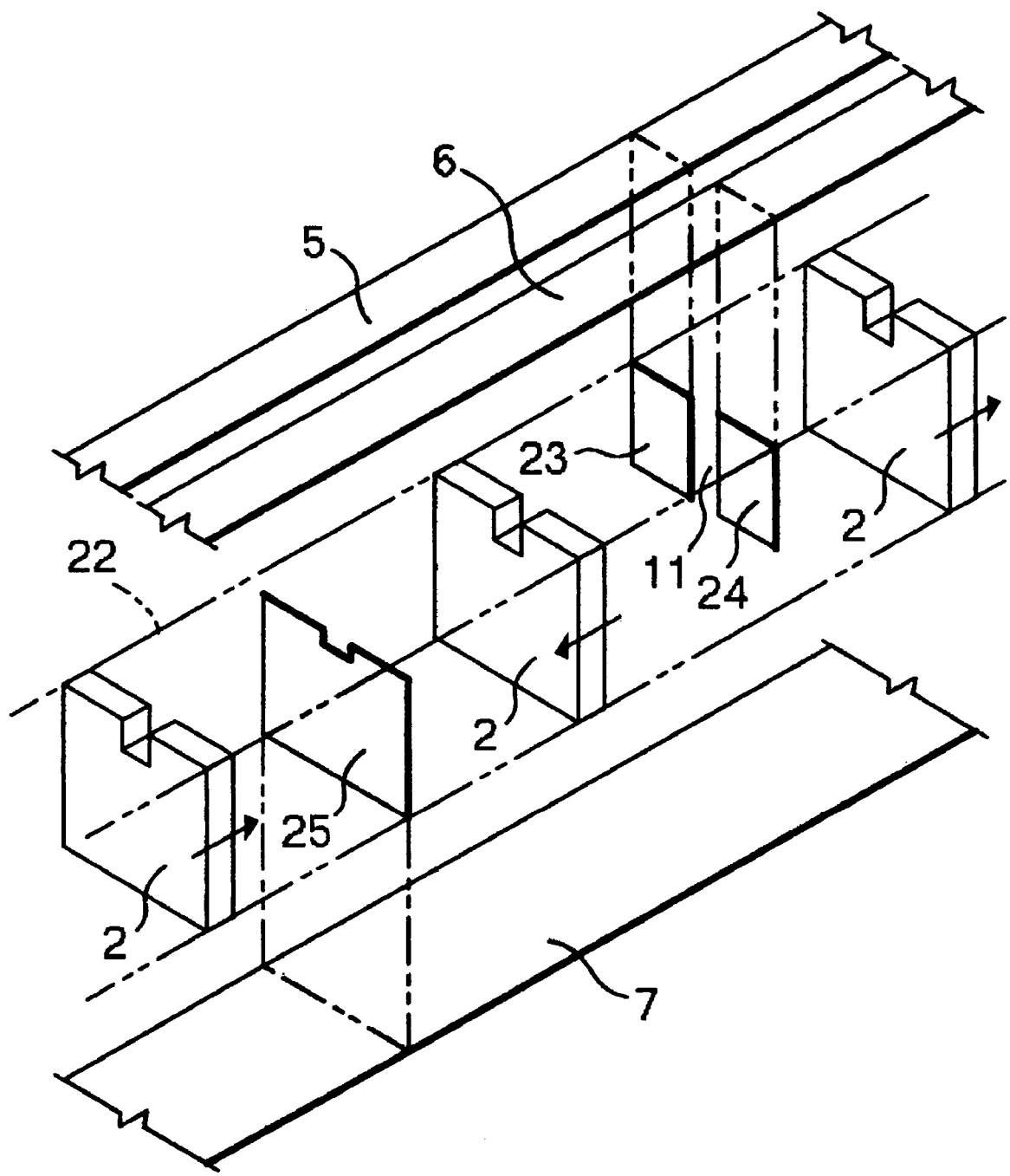
FIG. 8 is an exploded perspective view showing an enlarged essential portion of the vibratory gyro piezoelectric vibrator according to the second preferred embodiment of the present invention.

Here, the vibrating body 22 repeats vibration between an attitude bending as indicated by the dashed line in FIG. 7 and an attitude bending in the opposite direction thereof. Therefore, when the second bending vibration is excited and the vibrating body 22 therefore bends and vibrates in the width direction Z, signals depending on the bending in the width direction Z have opposite phases from each other among the outputs from the first internal electrode 23 and the second internal electrode 24. Therefore, as shown in FIG. 5, a difference between outputs caused in the first external electrode 5 and the second external electrodes 6 is detected, and a direction and magnitude of an applied angular speed are detected based on the detected difference.

In the description above, the vibratory gyro piezoelectric vibrator 1 according to the first preferred embodiment as shown in FIG. 1 is of the laterally-driven and longitudinally-detected type. The vibratory gyro piezoelectric vibrator 21 according to the second preferred embodiment as shown in FIG. 5 is of the longitudinally-driven and laterally-detected type. However, the vibratory gyro piezoelectric vibrator 1 according to the first preferred embodiment as shown in FIG. 1 may be of the longitudinally-driven and laterally-detected type. The vibratory gyro piezoelectric vibrator 21 according to the second preferred embodiment as shown in FIG. 5 may be of the laterally-driven and longitudinally-detected type. By the way, according to the first and second preferred embodiments, the vibratory gyro piezoelectric vibrators 1 and 21 are preferably piezoelectric tuning bars, but the applicable scope of the present invention is not limited only to piezoelectric tuning bars. The present invention may be applied to piezoelectric tuning forks and other arrangements.

Figure 9:
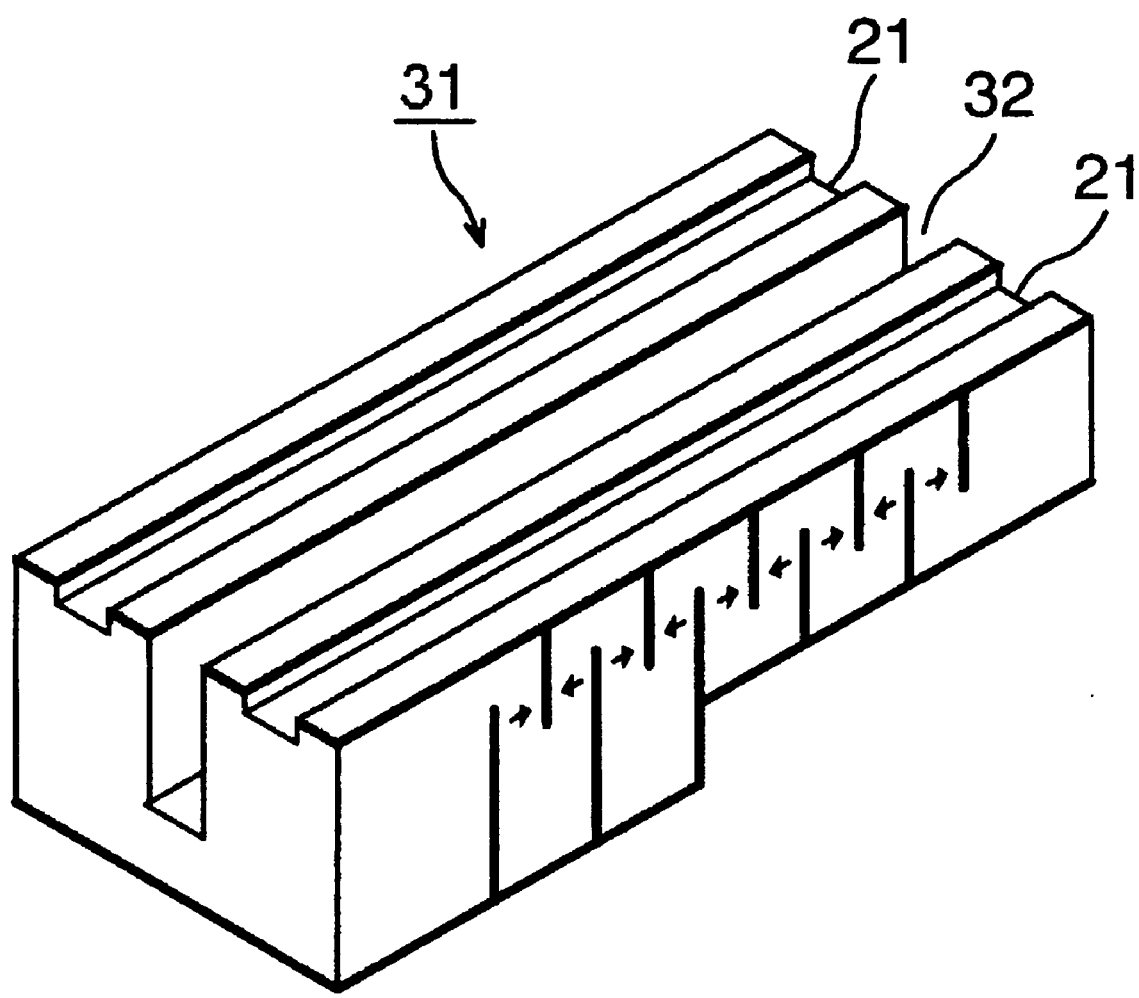
FIG. 9 is a perspective diagram showing an external form of a vibratory gyro piezoelectric tuning fork.

For example, as shown in FIG. 9, the laminate structure of the present invention can be applied to two legs 21 of a vibratory gyro piezoelectric tuning fork 31. In this case, the vibratory gyro piezoelectric tuning fork 31 has a construction in which ends of a pair of the vibratory gyro piezoelectric vibrators 21 disposed in parallel through a slit 32. More specifically, the same structure of the vibratory gyro piezoelectric vibrator 1 in FIG. 1 may be adopted as the basic structure of each of the legs 21.

The vibratory gyro piezoelectric tuning form 31 in this case is of the laterally-driven and longitudinally-detected type, and a direction and magnitude of an angular speed are detected based on an output from one of the vibratory gyro piezoelectric vibrators 21. Furthermore, a direction and magnitude of an angular speed are detected based on a difference between outputs from both of the vibratory gyro piezoelectric vibrators 21.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A vibratory gyro piezoelectric vibrator comprising:
   a vibrating body having a laminate of piezoelectric layers stacked in a lamination direction and having a length extending in the lamination direction, the vibratory gyro piezoelectric vibrator using longitudinal piezoelectric effects of the piezoelectric layers; and
   an oscillator electrically connected to the vibrating body; wherein
   electric signals produced by the oscillator and supplied to the vibrating body excite a first bending vibration in which the vibrating body bends in a width direction of the vibrating body perpendicular to the lamination direction of the piezoelectric layers;
   a Coriolis force is caused in response to the first bending vibration such that a second bending vibration is excited in which the vibrating body bends in a thickness direction of the vibrating body perpendicular to both of the lamination direction and the vibration direction of the first bending vibration; and
   while one of the first bending vibration and the second bending vibration is being excited, an electric signal caused by the other of the first bending vibration and the second bending vibration is output so as to be detectable by a detecting device.

2. A vibratory gyro piezoelectric vibrator according to claim 1, wherein the vibrating body includes first and second internal electrodes and third internal electrodes disposed alternately between the piezoelectric layers and polarized alternately oppositely in the lamination direction;
   the first and second internal electrodes are separately disposed parallel to the width direction of the vibrating body; and
   an area where the first and second internal electrodes are opposed to the third internal electrodes is one of an upper portion and a lower portion in the thickness direction of the vibrating body.

3. A vibratory gyro piezoelectric vibrator according to claim 2, wherein the vibrating body includes first and second external electrodes spaced in the width direction of the vibrating body in parallel on one main surface and a third external electrode on the other main surface;
   the first and second internal electrodes extend to the one main surface of the vibrating body and are conducted to the first and second external electrodes, respectively; and
   the third internal electrodes extend to the other main surface of the vibrating body and are conducted to the third external electrode.

4. A vibratory gyro piezoelectric vibrator according to claim 1, wherein the oscillator drives the vibrating body in a longitudinal direction.

5. A vibratory gyro piezoelectric vibrator according to claim 1, wherein the oscillator drives the vibrating body in a lateral direction.

6. A vibratory gyro piezoelectric vibrator according to claim 1, wherein the vibrator is a piezoelectric tuning bar.

7. A vibratory gyro piezoelectric vibrator according to claim 1, wherein the vibrator is a piezoelectric tuning fork.

8. A vibratory gyro piezoelectric vibrator according to claim 1, wherein the piezoelectric layers are lead-free.

9. A vibratory gyro piezoelectric vibrator according to claim 1, wherein the piezoelectric layers include a lead component.

10. A vibratory gyro piezoelectric vibrator according to claim 1, wherein the vibrating body has at least one groove on a surface thereof.

11. A vibratory gyro piezoelectric vibrator according to claim 1, wherein the piezoelectric layers are alternately polarized in opposite directions relative to each other.

* * * * *